May 26, 1959  A. GUDMUNDSEN  2,887,838
SINGLE ROTOR LAWN MOWER
Filed July 18, 1955
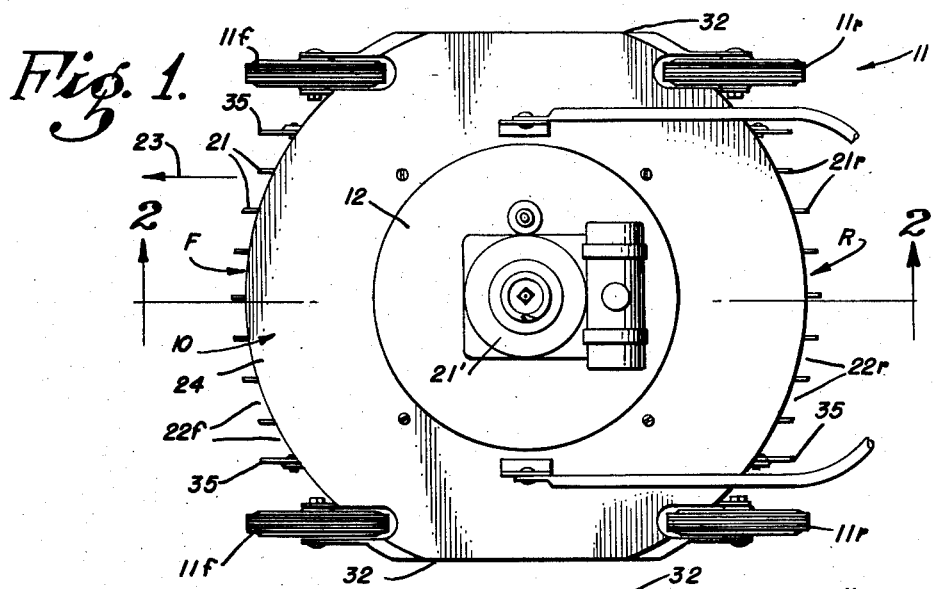
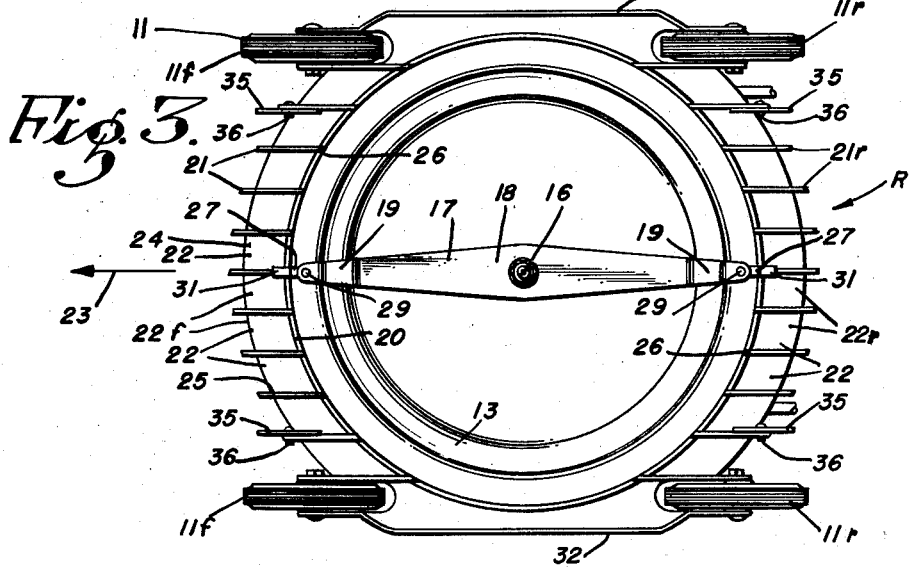
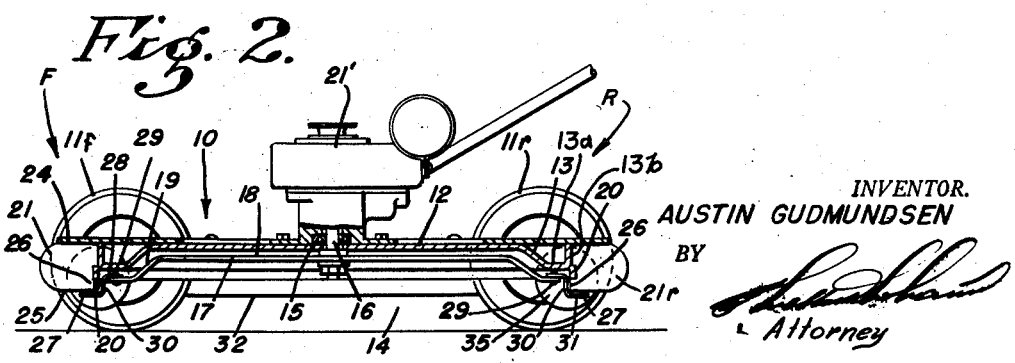
INVENTOR.
AUSTIN GUDMUNDSEN
BY
Attorney United States Patent Office 2,887,838
Patented May 26, 1959

2,887,838
SINGLE ROTOR LAWN MOWER

Austin Gudmundsen, Los Angeles, Calif., assignor to McCulloch Motors Corporation, Los Angeles, Calif., a corporation of Wisconsin Application July 18, 1955, Serial No. 522,796

3 Claims. (Cl. 56—25.4)

This invention relates to power driven lawn mowers of the type having a blade or blades which rotate around a vertical axis.

It is an object of the invention to provide a lawn mower of this type requiring relatively small power to drive the same and which has cutter and blade elements which cooperate in such a manner as to pulverize the cuttings, grass and associated debris such as leaves, etc., to such an extent that these pulverized cuttings will settle between the stocks and blades of the grass, thereby providing a clean appearing lawn without the necessity of using a catcher to pick up the cuttings.

It is a further object of the invention to provide a power operated lawn mower which is quite safe in its ordinary use so that there is little possibility of its injuring the user or others. The safety and power saving features of the lawn mower are derived from the offset blade or rotor construction having downwardly bent peripheral portions carrying small hinged cutters, the main body or carriage of the mower having downwardly extending outer walls which completely guard the blade or rotor and the cutters so that they can not encounter a hard object except with a glancing blow on the top. The hinged cutters are held outwardly in cutting positions by centrifugal force and readily swing back into retracted positions when they strike such objects and therefore have very little tendency to throw hard objects dangerously out from under the carriage or housing of the motor. Likewise, in the present construction the main blade or rotor encounters very little cut grass, thus operating with a minimum of power.

It is a further object of the invention to provide a lawn mower having cutters which are revolved in substantially horizontal planes, wherein an effective pulverizing of the cutting and debris is obtained by the provision of plates or walls arranged along an arc adjacent the forward portion of the path of movement of the cutters, forming a plurality of pockets or passages leading to the cutting zone. The cutters pass closely under the bottom edge of the plates, repeatedly cutting the grass and/or leaves into small bits which fall into the turf. The grass is cut off while the upper portion thereof is in the pockets, and as the cut grass (cuttings) passes out from the rear ends of the pockets it is cut up into very small pieces. For example, in the form of the invention disclosed herein, the rotor turns at about 3,000 r.p.m. Its two cutters, accordingly, produce 100 cuts per second past the rear end of each pocket. Therefore, the debris, such as the cuttings and the leaves, are subjected to 100 cuts per second as they pass out of the pockets.

Further objects and advantages of the invention may be brought out in the following part of the specification wherein small details of construction have been described for the purpose of competence of disclosure, without intending to limit the scope of the invention which is defined in the appended claims.

Referring to the accompanying drawings which are for illustrative purposes only:

Fig. 1 is a plan view of the mower;

Fig. 2 is a longitudinal sectional view taken as indicated by the line 2—2 of Fig. 1;

Fig. 3 is a bottom plan view corresponding to Fig. 1.

The lawn mower includes a carriage 10 of flat form wheeled for easy forward and rearward movement by use of four wheels 11, specifically identified as front wheels 11f and rear wheels 11r, which are arranged at the sides of the carriage 10 and at the four corners thereof as shown in Figs. 1 and 3. The carriage 10 has a substantially flat top wall 12 having a downwardly extending annular, peripheral wall 13 defining a shallow downwardly faced cavity 14, there being a horizontal part 13a about the outer periphery of the wall 13 and from the outer peripheral edge of the part 13a an annular flange 13b extends upwardly and terminates at the plane of the upper surface of the wall 12.

Bearing means 15 supported by the center of the top wall 12 supports a shaft 16. As shown in Fig. 2, the lower end of this shaft 16 extends into the shallow cavity 14 and has a rotor 17 fixed thereon. I have shown the rotor 17 as a bar or blade having its central portion fixed on the shaft 16. A major portion 18 of the rotor 17 lies close to the top wall 12 of the carriage 10 and the peripheral or end portions 19 thereof are bent downwardly so as to lie adjacent the lower edge or lip 20 of the annular wall 13. Accordingly, the major portion 18 of the rotor 17 is disposed above the horizontal plane in which the cuttings are formed, as will be hereinafter described.

A motor 21', which may be of small internal combustion type, is mounted on the top wall 12 of the carriage 10 and is connected to the shaft 16 for the purpose of driving the rotor 17.

At the front F of the carriage, between the front wheels 11f, plates 21 are arranged in laterally spaced relation so as to define a plurality of channels or pockets 22. The plates 21 are arranged in vertical planes parallel to the forward direction of movement of the carriage 10 indicated by the arrow 23, Fig. 3, and are arranged so as to lie partly under the front wall portion 24 secured to the top wall 12. The wall portion 24 cooperates with the wall 13b and lip 20 to form wall means extending across the upper rear portions of channels 22 to prevent movement of the grass cuttings upwardly out of the channels 22. The lower edges 25 of the plates 21 project below the lip 20 of the annular wall 13 so that the lower portions 26 of the rear edges of the plates 21 are exposed inwardly toward the cavity 14 below lip 20. A similar arrangement of plates 21r is provided at the rear R of the carriage to form horizontal channels or pockets 22r along the rearward portion of the annular wall 13 between the rear wheels 11r.

At least one cutter 27 is mounted on the periphery of the rotor 17. For the purpose of balance two of the cutters 27 are shown. They each comprise a thin blade of hardened steel having an inner substantially horizontal portion 28 pivotally connected to the rotor by a vertical pin 29. The inner portion 28 lies in a horizontal plane slightly above the lower edge of the lip 20, and from the outer end thereof a portion 30 extends downwardly so as to be contiguous to the exposed lower portion 26 of the inner edge of each plate 21 as the cutter 27 is moved through an arcuate path as the result of revolution of the rotor 17. From the lower end of the downwardly extending portion 30 a lower portion 31 of the cutter 27 extends horizontally outwardly under the plane defined by the lower edges 25 of the plates 21 so that as the lower cutter portions 31 are revolved around the axis of the shaft 16 they will pass in close proximity to the lower edges 25 of the plates 21.

As the mower is moved forwardly, the upper portions of the grass to be cut will pass into the channels 22 between the plates 21, but before the rearward edge portions 26 of the plates 21 reach the grass which has entered the channels 22, the lower forwardly projecting portions 31 of the cutters 27 will cut off the grass. Then, as forward movement of the plates 21 continues so that the cut grass moves out of the rearward ends of the channels 22 into the area below the cavity 14 it will be comminuted by the downwardly extending portions 30 of the cutters 27. If it may be considered that the grass moves through the channels 22 toward the rear edge portions 26 of the plates, it may be explained that before the grass reaches the rear ends of the pockets or channels 22 it is cut off and that the cut off portion of the grass is then fed out between the edge portions 26 to the cutter portions 30 which cut grass stems and stocks, and accompanying leaves, ec., into portions of such fineness that they will settle down into the turf. Should a cutter 27 strike a heavy object, it will swing back without damage thereto, owing to the fact that it is pivotally supported. The side walls 32 of the carriage 10 extend down below the horizontal plane in which the lower portions 31 of the cutters 27 revolve, so that the cutters are fully guarded from the side.

A further feature of the invention resides in the provision of auxiliary disc wheels 35 supported between the front wheels 11f and the rear wheels 11r on horizontal pins 36 carried by the lower portions of selected plates 21f and 21r. These disc wheels 35, which are made of thin metal are arranged so as to act as gauges in event that one of the wheels 11 should drop into a depression. In this event one of the disc wheels 35 will serve to support the adjacent part of the carriage and prevent the mower from "scalping" or cutting off the grass too close to the soil surface.

I claim:

1. In a lawn mower: a carriage having side wheels to support it for forward and rearward movement, said carriage having a downwardly faced cavity; a plurality of vertical plates arranged in laterally spaced relation so as to form downwardly faced channels leading from the front of the carriage rearwardly toward and communicating with the space at the lower extremity of said cavity, the lower edges of said plates lying close to a horizontal plane; a power driven rotor supported in said cavity for rotation around a vertical axis; at least one cutter projecting from the peripheral portion of said rotor, said cutter having an outer portion arranged to travel beneath and across the lower edges of said plates when said rotor is revolved around its axis; thin auxiliary disc wheels each being positioned against a side of a separate one of said plates; and pivot means connected to said last named plates for rotatably supporting said disc wheels.

2. In a lawn mower: a carriage having side wheels to support it for forward and rearward movement, said carriage having a downwardly faced cavity; a plurality of vertical plates arranged in laterally spaced relation so as to form downwardly faced channels leading from the front of the carriage rearwardly toward and communicating with the space at the lower extremity of said cavity, the lower edges of said plates lying close to a horizontal plane; wall means extending across at least a portion of the upper rear portions of said channels so as to prevent outflow upwardly and rearwardly from said channels; a power driven rotor supported in said cavity for rotation around a vertical axis; and at least one cutter projecting from the peripheral portion of said rotor, said cutter having an outer portion arranged to travel beneath and across the lower edges of said plates when said rotor is revolved around its axis.

3. In a lawn mower: a carriage having side wheels to support it for forward and rearward movement, said carriage having a downwardly faced cavity; a plurality of vertical plates arranged in laterally spaced relation so as to form downwardly faced channels leading from the front of the carriage rearwardly toward and communicating with the space at the lower extremity of said cavity, the lower edges of said plates lying close to a horizontal plane; wall means extending across at least a portion of the upper rear portions of said channels so as to prevent outflow upwardly and rearwardly from said channels; a power driven rotor supported in said cavity for rotation around a vertical axis; and at least one cutter projecting from a peripheral portion of said rotor, said cutter having an inner downwardly extending portion arranged to travel across the lower parts of the inner edges of said plates and an outer portion extending from the lower end of said inner portion and being positioned so as to travel beneath and across at least portions of lower edges of said plates when said rotor is revolved.

References Cited in the file of this patent

UNITED STATES PATENTS

| 1,336,257 | Muzzy | Apr. 6, 1920 |
| 1,880,154 | Rotondo et al. | Sept. 27, 1932 |
| 2,577,938 | Walte | Dec. 11, 1951 |
| 2,578,880 | Doyle | Dec. 18, 1951 |
| 2,720,071 | Watanabe | Oct. 11, 1955 |

FOREIGN PATENTS

| 163,556 | Australia | July 25, 1949 |